United States Patent [19]

Decker

[11] Patent Number: 5,899,020

[45] Date of Patent: May 4, 1999

[54] METHOD FOR THE VEGETATIVE PROPAGATION OF GRASSES

[76] Inventor: Henry F. Decker, 4751 Stover Rd., Ostrander, Ohio 43061

[21] Appl. No.: 08/855,783

[22] Filed: May 12, 1997

Related U.S. Application Data

[63] Continuation of application No. 08/438,372, May 10, 1995, abandoned.

[51] Int. Cl.⁶ ........................................... A01C 1/04
[52] U.S. Cl. ..................................... 47/58; 47/56; 47/1.01
[58] Field of Search ................................. 47/6, 7, 9, 56, 47/58, 1.01; 111/118; 172/19, 126

[56] References Cited

U.S. PATENT DOCUMENTS

| | | | |
|---|---|---|---|
| 4,099,345 | 7/1978 | Loads | 47/56 |
| 4,941,282 | 7/1990 | Milstein | 47/56 X |
| 5,189,833 | 3/1993 | Clark | 47/56 |
| 5,272,949 | 12/1993 | Holmes | 172/19 X |
| 5,507,845 | 4/1996 | Molnar et al. | 47/56 X |

*Primary Examiner*—Thomas B. Will
*Assistant Examiner*—Robert Pezzuto
*Attorney, Agent, or Firm*—Isaac A. Angres; Susan Petraglia

[57] ABSTRACT

A novel method is proposed for the vegetative propagation of grasses and some dicots comprised first of growing sods of the desired cultivar over plastic sheeting in a sterile medium. When the planting has matured into a sod, it is harvested in strips which are milled and screened into milled turf pieces or plantlets that are approximately 1 to 3 inches long. In comparison to a sprig or stolon, a milled turf piece or plantlet is produced from a complete piece of sod grown over plastic in which the complete root system has been contained. The milled turf product includes plantlets with complete root, stem and leaf tissue all ready to grow. Bushel for bushel, the milled turf product is more dense with more growing points or meristems and per area it provides quicker grow-in.

12 Claims, No Drawings

METHOD FOR THE VEGETATIVE PROPAGATION OF GRASSES

This application is a continuation of application Ser. No. 08/438,372 filed May 10, 1995, which application is now abandoned.

TECHNICAL FIELD

This invention relates to the vegetative establishment of largely warm season grasses such as bermudagrass in sod production, on golf courses, playing fields, home lawns, in commercial landscaping, and in other areas where a grass cover is desirable.

BACKGROUND OF THE INVENTION

A Tifdwarf bermudagrass golf green, for example, is typically established by planting sprigs or stolons that have been harvested from a registered Tifdwarf sod field. The sprigs or stolons are placed over the finish graded green typically in numbers of 20 to 40 bushels per 1,000 square feet and lightly disc harrowed into the sand surface of the green. In an alternative method, the sprigs are spread on the surface of the green which is then topdressed with approximately ⅜ inch layer of sand that is compatible with the existing soil profile of the green and then rolled. In some instances a light layer of sterile mulch is placed over the planting to help keep it moist.

Many grasses, largely warm season hybrid types, are propagated vegetatively in this manner because they are either sterile and do not produce seed or are very poor seed producers in which case it is more economical to propagate a useful grass vegetatively. Even grasses used for sod production, such as the elite Tifdwarf mentioned above, are planted vegetatively for the production of sod.

Sprigs or stolons are harvested from a sod field by running through it a verticutter. A verticutter is a machine that acts much like a dethatcher with swinging steel blades that cut and lift largely stolons, stem, and leaf material to the surface of the sod. This material is then gathered and sold by the "bushel" as sprigs or stolons for planting. Typically one "bushel" of sprigs or stolons consists of the material that is verticut and gathered from approximately one square yard of conventional sod grown on soil. Thus, an acre (4,840 square yards) of sod for sprigging typically yields 4,000 to 5,000 "bushel" of sprigs. The definition or exact measurement of a"bushel" however varies widely throughout the industry.

A recent innovation in the sod industry as described in U.S. Pat. Nos. 4,986,026, 5,177,898 and 5,301,446 has been the growing of grass sods in contrived media over plastic sheeting. Such a technique has several advantages over the production of sods in the conventional manner on soil. The sods grown over plastic can be harvested much more quickly largely because the primary rooting system of the grasses is used to knit the sod; they are often lighter especially compared to a sod grown on mineral soil; and a wide variety of often waste materials such as various composts, varying grades of sand, conifer barks, and many others can replace topsoil as growing medium.

Warm season grasses can also be adapted to production over plastic sheeting, and it has been the search for an effective method of planting vegetative material, rather than seed, on plastic sheeting that has led to the discovery described below.

SUMMARY OF THE INVENTION

A new method for the vegetative propagation of grasses, particularly warm season grasses, is presented. It consists first of growing registered stock of the desired cultivar in selected sterile media over plastic sheeting typically in a special, permanent nursery. When the nursery planting has matured into a sod, it is harvested off the plastic with all root systems intact. The strips are then milled, or otherwise separated, into one to three inch pieces or milled turf plantlets. The product is derived from whole sod pieces, including stems, leaves, and stolons as well as roots, crowns, and rhizomes. As a result many of the plantlets are comprised of complete root, stem, and leaf tissue all ready to grow.

Vegetative planting material produced in this fashion from whole sod is, bushel for bushel, more dense than planting material consisting of sprigs and stolons alone. A bushel of the latter is defined as the gatherings from verticutting one square yard of soil grown sod and consists largely of stem, leaf, and stolons; whereas a bushel of milled plantlets beside stem, leaf, and stolon is comprised of the entire plant including as well roots, crowns, and rhizomes. As a result, on the basis of volume, the more dense milled turf product has more growing points or meristems and hence a quicker grow-in time.

Another important feature of the new method, in cases in which purity of the registered stock is essential, is that the sod nurseries are grown in sterile media and as well over an impervious surface such as plastic sheeting which prevents soil contamination.

DESCRIPTION OF THE INVENTION

My research has led to the discovery of a vastly improved method for the production of vegetative material for use in the establishment of all types of turf areas as reported earlier in Document Disclosure #363,575. The method is particularly useful in the vegetative propagation of warm season grasses such as bermudagrass, zoysiagrass, ST. Augustinegrass, buffalograss, and others; and it is adaptable as well to some dicot crops such as, for example, the perennial or rhizome peanut. It is a sterile growing process that maintains the purity of the cultivar.

The method consists first of growing sods of the desired cultivar over plastic sheeting in a sterile medium such as composted yard waste, composted sewage sludge, sand, or conifer bark, or combinations of these, or practically any organic or mineral matter that is relatively inert and that is sterile or can be sterilized economically. When the planting has matured into a sod, it is harvested in strips and then taken to a shredder, grinder, or hammermill, or any device that can separate the sod and screen it into turf pieces or plantlets that are approximately 1 to 3 inches long.

A milled turf piece or plantlet is not to be confused with a sprig or stolon which are products of the convention sod industry and are harvested by essentially dethatching or raking existing, conventional, soil-grown sod which brings up largely ungerminated, unrooted, stolons, leaf, and stem tissue. In the trade a "bushel" of sprigs or stolons typically defined as the material that is verticut or raked up and gathered from one square yard of conventional sod.

In comparison to a sprig or stolon, a milled turf piece or plantlet is produced from a complete piece of harvested sod that has been grown over plastic in which the root system of the planting has been contained or trapped so to speak by the plastic. The sod then is harvested intact and hence the milled turf pieces or plantlets are comprised not only of stolon, leaf, and stem tissue but of the whole plant system including rhizomes, crowns, primary and secondary root tissue. Some of the milled turf product includes plantlets with complete root, stem, and leaf tissue all ready to grow. A bushel of milled turf, then, is derived from a complete or whole square yard of sod, roots and all and hence is much closer to the true volume of a bushel (1.24 cubic feet).

One advantage of milled turf plantlets is that a given volume is more dense than an equal volume of sprigs or stolons and yields more separated growing points or meristems. Another advantage is that when planted, the milled turf plantlets cover a given area more densely and more evenly than an equal volume of sprigs or stolons. Further, the milled vegetative material consists of plantlets comprised of whole plant tissue often with intact root systems ready to grow. Further still, since there are more meristems than conventional sprigs or stolons, the grow-in period is shorter. Moreover, the planting material derived from turf milled according to the invention is more economical per volume than conventional sprigs or stolons.

Another often useful advantage to the milled turf is that since it is grown over plastic sheeting in sterile media and not in soil, it is less subject to contamination. This is a critical feature in instances where it is important to maintain the purity of the planting stock.

What is claimed:

1. A method for maintaining the purity of and simultaneously increasing the quantity of a vegetatively propagated planting material of a desired cultivar, comprising the steps of
   (A) cultivating and simultaneously protecting an original pure stock of a cultivar from soil contamination and growth medium contamination by
      i) providing a plastic sheeting as a sterile support for growing said original pure stock,
      ii) providing a sterile growth medium on top of said plastic sheeting,
      iii) planting said original pure stock in said sterile growth medium,
      iv) growing said original pure stock into a sod within a confined area over said plastic sheeting,
   (B) harvesting the sod off the plastic sheeting, and
   (C) separating whole pieces of the sod into a fragmented form consisting essentially of pieces and plantlets that are approximately one to three inches in length and that are suitable for vegetative propagation.

2. The method according to claim 1, wherein the step of separating whole pieces of sod into a fragmented form is accomplished by passing said whole pieces of sod through a device comprising a shredding device, a grinding device, a hammermill, or other suitable device capable of separating and screening sod into 1 to 3 inch pieces and plantlets.

3. The method according to claim 2, wherein the separating step separates whole pieces of sod into a fragmented form selected from the group consisting of pieces and plantlets of leaf, stem, stolon, crown, rhizome, and root.

4. The method according to claim 3, wherein the separating step separates whole pieces of sod into a fragmented form selected from the group consisting of intact tissues from root, stem, and leaf that are ready to grow.

5. The method according to claim 1, wherein the step of providing a sterile growth medium on top of said plastic sheeting is by covering said plastic sheeting with organic matter that is substantially inert and naturally sterile or readily sterilizable prior to use, prior to growing said pure stock into a sod.

6. The method according to claim 1, wherein the step of providing a sterile growth medium to said plastic sheeting is by covering said plastic sheeting with mineral matter that is substantially inert and naturally sterile or readily sterilizable prior to use, prior to growing said original pure stock into a sod.

7. The method according to claim 1, wherein the step of providing a sterile growth medium to said plastic sheeting is by covering said plastic sheeting with sterile sand prior to growing said original pure stock into a sod.

8. The method according to claim 1, wherein the step of providing a sterile growth medium to said plastic sheeting is by covering said plastic sheeting with a composted organic matter that has been sterilized to remove biological activity, prior to growing said original pure stock into a sod.

9. A substantially pure vegetatively propagated planting material of a desired cultivar produced in accordance with the method of claim 1.

10. A substantially pure vegetatively propagated planting material according to claim 9, wherein said desired cultivar is selected from the group consisting of registered turfgrasses, forage grasses, monocots, and dicots.

11. A substantially pure vegetative sod planting material comprising whole plant tissues selected from the group consisting of leaf, stem, stolon, crown, rhizome, and root, and having a density and a quantity of growing points and meristems per volume that is greater than that of sprigs or stolons produced by conventional verticutting, produced by
   (A) cultivating and simultaneously protecting an original pure stock of a cultivar from soil contamination and growth medium contamination by
      i) providing a plastic sheeting as a sterile support for growing said original pure stock,
      ii) providing a sterile growth medium on top of said plastic sheeting,
      iii) planting said original pure stock in said sterile growth medium,
      iv) growing said original pure stock into a sod within a confined area over said plastic sheeting,
   (B) harvesting the sod off the plastic sheeting, and
   (C) separating whole pieces of the sod into a fragmented form consisting essentially of pieces and plantlets that are approximately one to three inches in length and that are suitable for vegetative propagation.

12. The vegetative sod planting material according to claim 11 further characterized by possessing more rapid grow-in and cover periods than a comparable volume of sprigs and stolons from conventional verticutting.

* * * * *